(12) United States Patent
Vincent et al.

(10) Patent No.: US 9,496,579 B2
(45) Date of Patent: Nov. 15, 2016

(54) FUEL CELL LIMITING THE PHENOMENON OF CORROSION

(71) Applicant: Commissariat à l'énergie atomique et aux énergies alternatives, Paris (FR)

(72) Inventors: Rémi Vincent, Grenoble (FR); Benoît Barthe, Chindrieux (FR); Denis Tremblay, Pommiers-la-Placette (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/425,447

(22) PCT Filed: Aug. 30, 2013

(86) PCT No.: PCT/EP2013/068036
§ 371 (c)(1),
(2) Date: Mar. 3, 2015

(87) PCT Pub. No.: WO2014/033283
PCT Pub. Date: Mar. 6, 2014

(65) Prior Publication Data
US 2015/0228998 A1 Aug. 13, 2015

(30) Foreign Application Priority Data

Sep. 3, 2012 (FR) ..................................... 12 58200

(51) Int. Cl.
*H01M 8/24* (2016.01)
*H01M 8/10* (2016.01)
*H01M 8/02* (2016.01)

(52) U.S. Cl.
CPC ........... *H01M 8/248* (2013.01); *H01M 8/0247* (2013.01); *H01M 8/0297* (2013.01); *H01M8/1018* (2013.01); *H01M 8/241* (2013.01); *H01M 8/2404* (2016.02); *H01M 8/249* (2013.01); *H01M 8/0206* (2013.01); *H01M 2008/1095* (2013.01); *H01M 2250/20* (2013.01); *H01M 2300/0082* (2013.01); *Y02E 60/50* (2013.01)

(58) Field of Classification Search
CPC ...................................................... H01M 8/24
See application file for complete search history.

(56) References Cited

U.S. PATENT DOCUMENTS

| 2005/0233080 | A1* | 10/2005 | Ji | D21H 19/66 |
| | | | | 427/256 |
| 2006/0046130 | A1* | 3/2006 | Lai | H01M 8/0228 |
| | | | | 429/442 |

(Continued)

FOREIGN PATENT DOCUMENTS

| JP | 2008293744 | 12/2008 |
| WO | 2006016462 | 2/2006 |

(Continued)

OTHER PUBLICATIONS

JP 2008-293744 (MT+Abstract).*

*Primary Examiner* — Patrick Ryan
*Assistant Examiner* — Alex Usyatinsky
(74) *Attorney, Agent, or Firm* — Occhiuti & Rohlicek LLP

(57) ABSTRACT

A fuel cell stack includes first and second membrane electrode assemblies and a metal bipolar plate interposed between the first and second membrane electrode assemblies. The bipolar plate comprises first and second metal sheets facing the first and second membrane electrode assemblies and is securely fastened by welds. There is a gas diffusion layer interposed and compressed between the first membrane electrode assembly and the bipolar plate. In the absence of compression on the gas diffusion layer, regions of the gas diffusion layer surrounding the welds have a thickness smaller by at least 5 µm relative to the average thickness of the gas diffusion layer. This is done so that the contact pressure of the gas diffusion layer with the bipolar plate in the area of the welds is lower than its average contact pressure with the bipolar plate.

6 Claims, 4 Drawing Sheets

(56) References Cited

U.S. PATENT DOCUMENTS

| | | | |
|---|---|---|---|
| 2008/0038609 A1* | 2/2008 | Yoshizawa | H01M 8/023 429/434 |
| 2008/0292916 A1* | 11/2008 | Newman | H01M 8/0202 429/409 |
| 2009/0053571 A1* | 2/2009 | Takata | H01M 8/0206 429/434 |
| 2010/0104913 A1* | 4/2010 | Yamauchi | H01M 8/0273 429/465 |

FOREIGN PATENT DOCUMENTS

| | | |
|---|---|---|
| WO | 2009043600 | 4/2009 |
| WO | 2012163842 | 12/2012 |

* cited by examiner

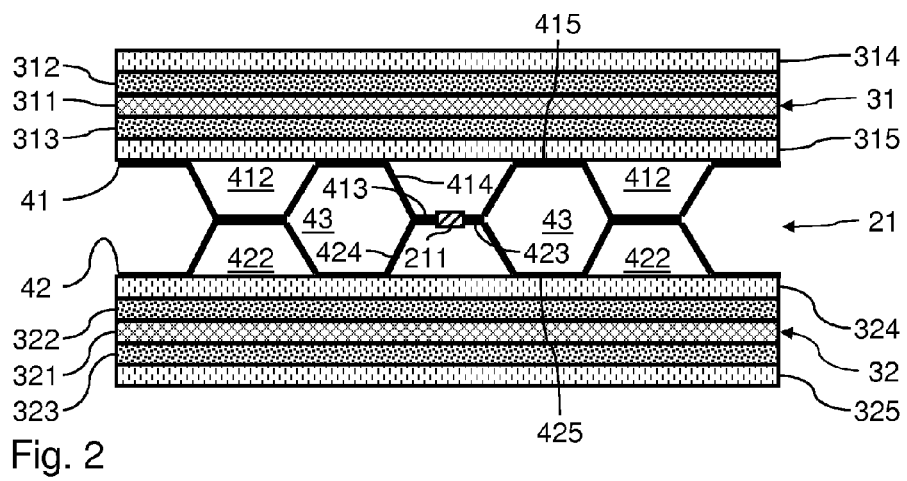
Fig. 2
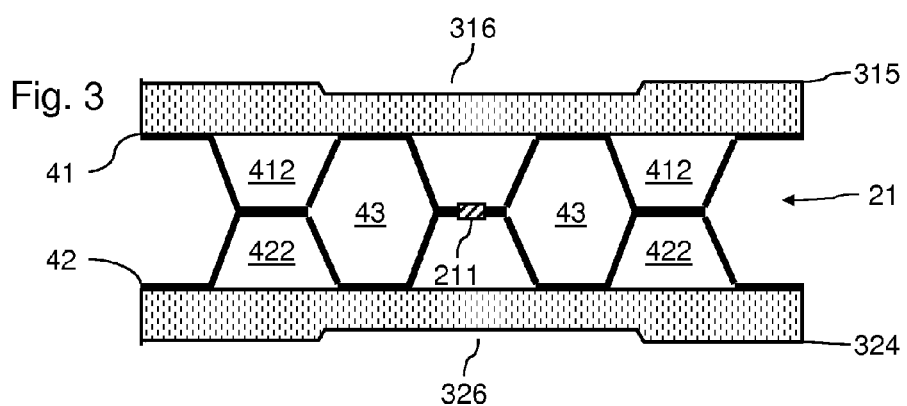
Fig. 3
Fig. 4
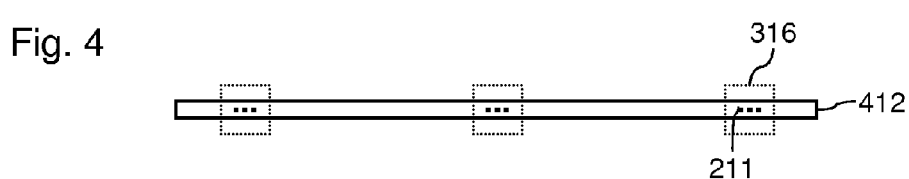

FUEL CELL LIMITING THE PHENOMENON OF CORROSION

RELATED APPLICATIONS

This application is a U.S. National Stage of international application number PCT/EP2013/068036 filed Aug. 30, 2013, which claims the benefit of the priority date of French Patent Application FR 1258200, filed Sep. 3, 2012, the contents of which are herein incorporated by reference.

FIELD OF INVENTION

The invention relates to fuel cells, and in particular to proton exchange membrane (PEM) fuel cells.

BACKGROUND

Fuel cells are envisioned as systems for supplying electricity to mass produced automotive vehicles in the future, and for many other applications. A fuel cell is an electrochemical device that converts chemical energy directly into electrical power. Dihydrogen is used as the fuel of fuel cells. The dihydrogen is oxidized and ionized at an electrode of the cell and dioxygen from the air is reduced at another electrode of the cell. This chemical reaction produces water at the cathode, the oxygen being reduced and reacting with the protons. The great advantage of fuel cells is that they do not emit atmospheric pollutants at the point of generation of electricity.

Proton exchange membrane (PEM) fuel cells have properties, as regards their compactness, that are particularly advantageous. Each cell comprises an electrolytic membrane that only allows protons and not electrons to pass. The membrane comprises an anode on a first face and a cathode on a second face, in order to form a membrane electrode assembly (MEA).

At the anode, the dihydrogen is ionized to produce protons that pass through the membrane. The electrons produced by this reaction migrate toward a flow plate, then flow through an electrical circuit that is external to the cell in order to form an electrical current. At the cathode, oxygen is reduced and reacts with the protons to form water.

The fuel cell may comprise a plurality of flow plates, for example made of metal, stacked one on top of the other. The membrane is placed between two flow plates. The flow plates may comprise channels and orifices for guiding reactants and products to/from the membrane. The plates are also electrically conductive in order to collect the electrons generated at the anode. Gas diffusion layers are interposed between the electrodes and the flow plates and make contact with the flow plates.

The flow plates make contact with very acidic solutions. On the cathode side, the plate is subjected to pressurized air in a highly oxidizing environment. On the anode side, the plate makes contact with hydrogen. Under such conditions, the metal plates are subject to corrosion. Corrosion of a plate leads, on the one hand, to the emission of metal ions, which adversely affect the operation of the electrolytic membrane. On the other hand, corrosion of the plate leads to an insulating oxide layer forming on the metal, thereby increasing its contact resistance with the gas diffusion layer. The electrical resistance between the flow plate and the gas diffusion layer is thus increased. These effects decrease the performance of the fuel cell. The flow plates must therefore have a high electrical conductivity while resisting oxidation and corrosion.

If fuel cells are to be produced industrially, the production cost of the various components will have to decrease. In particular, the cost of flow plates is still far too high for mass market use.

To decrease the cost of flow plates, the latter generally take the form of a bipolar plate comprising two flow plates. One industrially tried-and-tested solution consists in punching two metal sheets made of stainless steel and assembling them back to back by laser welding to form flow plates for adjacent cells. The welds are produced in the bottom of channels, the channel bottoms of two back-to-back metal sheets being placed in contact. In order to decrease production costs, the back-to-back metal sheets have the same geometry.

Document US 2006/046130 describes a fuel cell intended to limit the influence of variations in compressive forces on a stack of cells. The bipolar plates are formed by assembling two metal sheets. Each metal sheet contains a relief in order to form gas flow channels. A multitude of adjacent channels extend in a given direction. Two metal sheets are assembled by placing the bottom of certain channels of these sheets in contact and then producing welds in these bottoms.

In practice, membrane electrode assemblies of known fuel cells have a relatively nonuniform operation. This nonuniformity is due to various effects such as variations in gas moisture content between the inlet and outlet of the membrane electrode assembly. This nonuniformity increases current density locally, promoting localized corrosion of the carbon. Moreover, a higher current density is observed at the welds, the welds substantially increasing conductivity locally. Since the welds of stacked bipolar plates are often superposed, a higher current density is observed through the stack in the area of such a superposition of welds.

SUMMARY

The invention especially aims to solve this drawback. The invention especially aims to obtain a fuel cell or fuel cell stack that is less expensive and that promotes a more uniform current density through its membrane electrode assemblies. Thus, the invention relates to a fuel cell stack and to a process for manufacturing a fuel cell stack, such as defined in the appended claims.

Other features and advantages of the invention will become more clearly apparent from the description that is given thereof below, by way of nonlimiting illustration, and with reference to the appended figures.

BRIEF DESCRIPTION OF THE DRAWINGS

FIG. 2 is a cross-sectional view of the fuel cell in FIG. 1;

FIG. 3 is an enlarged cross-sectional view through a weld of a fuel cell according to one embodiment of the invention;

FIG. 4 is a schematic top view of welds illustrating one example arrangement of recesses in a gas diffusion layer;

DETAILED DESCRIPTION

The invention provides a fuel cell or fuel cell stack equipped with two membrane electrode assemblies and a metal bipolar plate interposed between these assemblies. The bipolar plate comprises two metal sheets facing respective membrane electrode assemblies and securely fastened by welds. A gas diffusion layer is interposed and compressed between a membrane electrode assembly and the bipolar plate. The contact pressure of the gas diffusion layer with the bipolar plate at the welds is lower than its average contact pressure with the bipolar plate. For this purpose, the gas diffusion layer at rest advantageously has a thickness at the welds smaller than the average thickness of the gas diffusion layer.

Thus, the bulk conductivity of the gas diffusion layer at the welds is reduced, thereby compensating for the conductivity through the flow plate at the welds, which is very much higher than its conductivity in other regions. Thus, the invention allows the uniformity of the current density through the fuel cell stack to be significantly optimized (and therefore the corrosion resistance and longevity of the fuel cell to be improved), without requiring weld density and therefore industrial cost to be increased. The invention runs counter to the approach usually taken by the person skilled in the art of systematically increasing bipolar plate conductivity in order to minimize electrical resistance.

Figure 1:
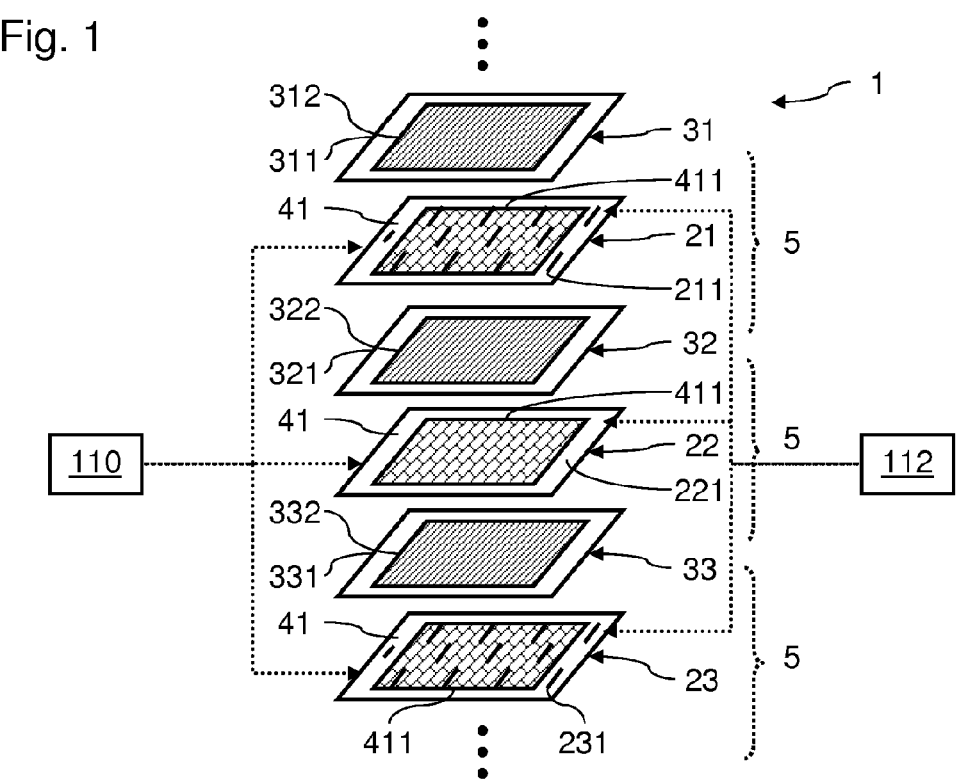
FIG. 1 is an exploded perspective view of an example of a fuel cell.

FIG. 1 is a schematic exploded perspective view of one portion of a fuel cell 1 according to one embodiment of the invention. The fuel cell 1 is a proton exchange membrane or polymer electrolyte membrane fuel cell. The fuel cell 1 comprises a plurality of superposed cells 5. The fuel cell 1 comprises a fuel source 110 supplying an inlet of each cell 5 with dihydrogen. The fuel cell 1 also comprises a source 112 of air supplying an inlet of each cell with air, containing the oxygen used as oxidant. Each cell 5 also comprises exhaust channels (not illustrated). Each cell 5 may also comprise a cooling circuit (not illustrated).

Each cell 5 comprises a membrane electrode assembly. The fuel cell 1 illustrated especially comprises membrane electrode assemblies or MEAs 31, 32 and 33. The membrane electrode assemblies are here superposed and electrically connected in series. Each membrane electrode assembly comprises an electrolyte layer formed for example from a polymer membrane (311, 321 and 331 for the assemblies 31, 32 and 33, respectively).

A membrane electrode assembly also comprises a cathode (not illustrated in FIG. 1) and an anode (312, 322 and 332 for the assemblies 31, 32 and 33, respectively) placed on either side of the electrolyte and fastened to this electrolyte.

The electrolyte layer forms a semipermeable membrane enabling proton conduction while being impermeable to the gases present in the cell. The electrolyte layer also prevents the passage of electrons between the anode and cathode.

Each cell 5 contains flow guide plates placed facing the anode and cathode, respectively. Each cell 5 in addition contains a gas diffusion layer (not illustrated) placed between the anode and the guide plate. Each cell 5 moreover contains a gas diffusion layer (not illustrated) placed between the cathode and the guide plate.

Between each pair of adjacent MEAs, a pair of flow guides is placed. The flow guides of each pair are securely fastened in order to form a bipolar plate. Thus, the fuel cell 1 comprises a bipolar plate 21 (placed between the MEAs 31 and 32), a bipolar plate 22 (placed between the MEAs 32 and 33) and a bipolar plate 23. Each flow guide is formed from a metal sheet. The bipolar plate 21 thus comprises a metal sheet 41 oriented toward the cathode of the MEA 31 and a metal sheet 42 oriented toward the anode of the MEA 32. The metal sheet 41 has a surface containing a relief 411 defining flow channels 412. The metal sheet 42 has a surface containing a relief defining flow channels 422. The metal sheets 41 and 42 are securely fastened by the welds 211, 221 and 231 for the bipolar plates 21, 22 and 23, respectively. For the sake of legibility, only a small number of welds has been illustrated, these welds being illustrated very schematically. The welds 211, 221 and 231 of the various bipolar plates are here superposed for the sake of industrial simplicity. The invention proves to be particularly advantageous with such a superposition (in the direction of the stack) of the welds of various bipolar plates of the stack of cells 5. Such a superposition of regions having potentially high conductivity is liable to increase locally the current densities in the stacking direction.

As is known per se, during operation of the fuel cell 1, air flows between the MEAs and the metal sheets 41, and dihydrogen flows between the MEAs and the metal sheets 42. A series current is thus established through the stack of cells 5. At the anodes, the dihydrogen is ionized to produce protons that pass through the MEAs. The electrons produced by this reaction are collected by a plate 21. The electrons produced are then applied to an electrical load connected to the fuel cell 1 in order to form an electrical current. At the cathodes, oxygen is reduced and reacts with the protons to form water. The reactions at the anode and cathode are written as follows:

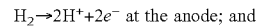
$H_2 \rightarrow 2H^+ + 2e^-$ at the anode; and

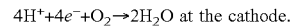
$4H^+ + 4e^- + O_2 \rightarrow 2H_2O$ at the cathode.

During its operation, one cell of the fuel cell stack usually generates a DC voltage between its anode and cathode of about 1 V.

FIG. 2 is a schematic cross-sectional view of the fuel cell 1, level with a bipolar plate 21. The MEA 31 comprises gas diffusion layers 314 and 315 placed on the anode 312 and on the cathode 313, respectively. The MEA 32 comprises gas diffusion layers 324 and 325 placed on the anode 322 and on the cathode 323, respectively. The gas diffusion layers 314 and 324 serve to diffuse dihydrogen toward their respective anode. The gas diffusion layers 315 and 325 serve to diffuse dioxygen toward their respective cathode. The gas diffusion layer 315 is interposed and compressed between the metal sheet 41 of the bipolar plate 21 and the cathode 313 of the MEA 31. The gas diffusion layer 324 is interposed and compressed between the metal sheet 42 of the bipolar plate 21 and the anode 322 of the MEA 32.

The metal sheet 41 contains a relief in which successive flow channels 412 are formed extending in a longitudinal direction. The flow channels 412 are distributed in a transverse direction. The metal sheet 42 contains a relief in which successive flow channels 422 are formed extending in a longitudinal direction. The flow channels 422 are distributed in a transverse direction. The flow channels 412 and 422 are advantageously superposed. The metal sheets 41 and 42 thus bonded advantageously define, between each other, a flow circuit 43 for a coolant. The flow channels 412 are bounded by bottoms 413, sides 414 and tops 415. Similarly, the flow channels 422 are bounded by bottoms 423, sides 424 and tops 425. The bottoms 413 and 423 are placed in contact in order to minimize the contact resistance between the metal sheets 41 and 42. The tops 415 and 425 form regions of contact with the gas diffusion layers 315 and 324, respectively. In the bipolar plate 21, the welds 211 are produced locally in the bottom 413 and 423 of certain flow channels. For the sake of simplicity, the inlets and outlets produced in the metal sheets 41 and 42 to communicate with the flow channels 412 and 422 are not illustrated.

FIG. 3 is an enlarged cross-sectional view through a weld 211 between the metal sheets 41 and 42. The gas diffusion layers 315 and 324 are here illustrated at rest, i.e. in the absence of compression between their membrane electrode assembly and the bipolar plate 21. The gas diffusion layers 315 and 324 are designed so that after the fuel cell 1 has been assembled and the stack of cells 5 tightened, their contact pressure level at the welds 211 is lower than their average contact pressure. The average contact pressure of a gas diffusion layer with a bipolar plate may be calculated by dividing the contact force between the gas diffusion layer and the bipolar plate by the contact area between this gas diffusion layer and this bipolar plate. Advantageously, the contact pressure of the gas diffusion layer at the welds 211 is at least 15% lower than its average contact pressure.

For this purpose, the gas diffusion layers 315 and 324 comprise regions 316 and 326, respectively, placed level with the welds 211. The regions 316 and 326 are placed plumb with the welds 211. The thickness of the regions 316 and 326 is smaller than the average thickness of their gas diffusion layer. Thus, during the compression associated with tightening of the stack of the fuel cell 1, the regions 316 and 326 will be subjected to a smaller deformation and therefore to a lower contact pressure with the bipolar plate 21 and the MEA assemblies. The regions 316 and 326 typically have a thickness smaller by 5 µm relative to the average thickness of their gas diffusion layer. These regions 316 and 326 here have a uniform thickness. The gas diffusion layers 316 and 326 advantageously comprise, in the absence of compression, a first flat face and a second face containing a relief bounding the regions 316 and 326, respectively. Here, the face containing the relief is placed in contact with a membrane electrode assembly, however, the face containing the relief may also be placed in contact with the bipolar plate 21.

The regions 316 and 326 extend laterally as far as adjacent flow channels 412 and 422, respectively. The regions 316 and 326 thus make contact with the tops 415 and 425 placed on either side of the welds 211, respectively.

As illustrated in FIG. 4, the regions of lower contact pressure 316 surround the welds 211. The welds 211 are here distributed longitudinally in a flow channel 412. The welds 211 are here produced locally in the form of a series of closely spaced spot welds.

It is possible, at the design stage, to determine the thickness difference at rest between the regions 316 and the average or nominal thickness of a gas diffusion layer, this thickness difference allowing a lower pressure to be obtained in the area of the welds after mounting and thus to compensate the higher conductivity of the welds.

Figure 5:
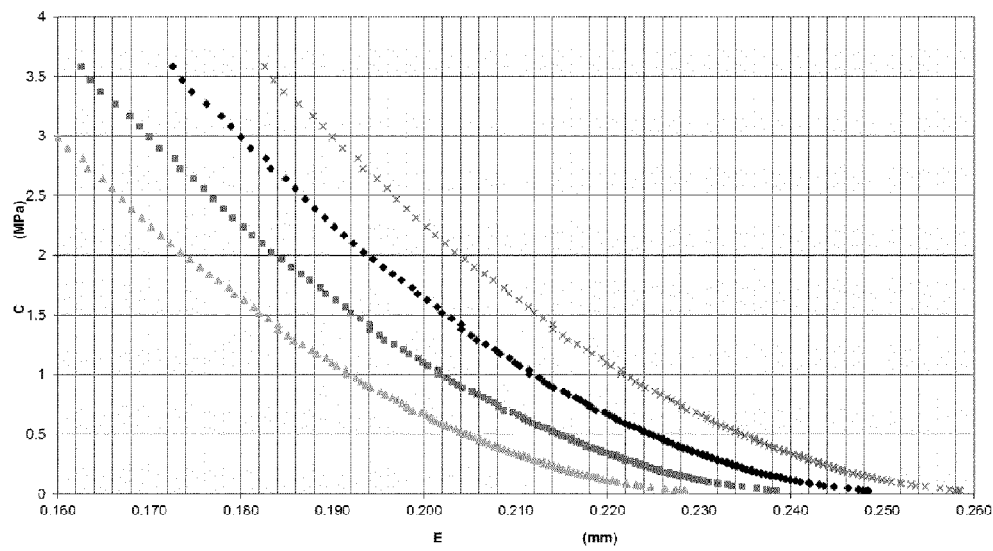
FIG. 5 is an example of graph allowing the thickness of a gas diffusion layer to be determined as a function of the compression that is applied thereto, for various values of initial thickness.

For this purpose, it is possible to determine beforehand:
a relationship allowing the thickness of the gas diffusion layer to be deduced as a function of its contact pressure, and as a function of its thickness at rest. This relationship may for example be determined during deformation trials carried out on the material of the gas diffusion layer. In the detailed example described below, such a relationship is defined by way of a chart such as illustrated in FIG. 5. For various thicknesses at rest of the gas diffusion layer, this chart gives the thickness Ep of this layer for various contact pressures C; and
a relationship allowing the bulk conductivity of the gas diffusion layer to be deduced as a function of the contact pressure that is applied thereto. This relationship may for example be determined during conductivity trials carried out during compression on the material of the gas diffusion layer. In the example detailed below, such a relationship is defined by way of a graph such as that illustrated in FIG. 6. This graph gives the bulk electrical conductivity Co of the gas diffusion layer for various contact pressures C.

One example set of dimensions may be the following: the contact resistance between the metal sheets 41 and 42 is assumed to be 0.06Ω whereas the resistance of the welds 211 is substantially zero. Therefore, the dimensions of the regions 316 have the objective of adding 0.06Ω level with the welds 211.

It is assumed that an average contact pressure of 1 MPa is desired for the gas diffusion layer and that the latter has a thickness of 200 µm under this pressure. It is assumed that an identical thickness of 200 µm is desired for the regions 316. It is assumed that the regions 316 will form two rectangular geometric contacts each of 2.5 by 5 mm with the tops placed on either side of the welds.

The resistance R in the area of the welds may be expressed in the following way:
R=L/(Co×S), where L is the thickness in region 316, S is the area of contact of the region 316, and Co is conductivity in its thickness.

Figure 6:
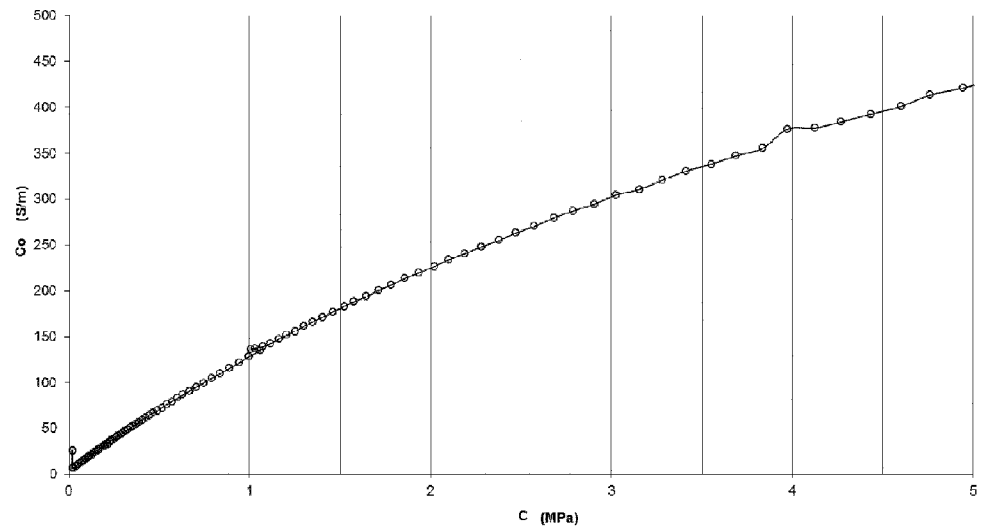
FIG. 6 is an example of graph allowing the bulk electrical conductivity of a gas diffusion layer to be deduced as a function of the compressive stress that is applied thereto.

By consulting the graph in FIG. 6, it can be seen that a gas diffusion layer compressed at 1 MPa has a conductivity of 135 S/m. Thus, a region 316 compressed at 1 MPa would have a resistance of 0.06Ω. As it is desired to add a resistance of 0.06Ω to this value, it is necessary to determine the contact pressure allowing a resistance of 0.12Ω to be obtained. It is deduced from the graph in FIG. 6 that a pressure of 0.6 MPa provides a conductivity of about 68 S/m, allowing such a resistance value to be obtained.

The thickness at rest required for the region 316 may then be extrapolated from the chart in FIG. 5. It may thus be observed that a gas diffusion layer having a thickness at rest of 240 µm has a contact pressure of 1 MPa with a thickness of 200 µm. The curve corresponding to a gas diffusion layer having the same thickness under a contact pressure of 0.6 MPa is then sought. The sought-after curve corresponds to a gas diffusion layer having a thickness at rest of 230 µm. It is therefore deduced therefrom that the region 316 must be produced with a thickness that is 10 µm smaller relative to a nominal thickness of 240 µm.

The gas diffusion layers may for example be produced, as is known per se, from fiber, felt or woven graphite to which a hydrophobic agent such as polytetrafluoroethylene is fixed.

Figure 7:
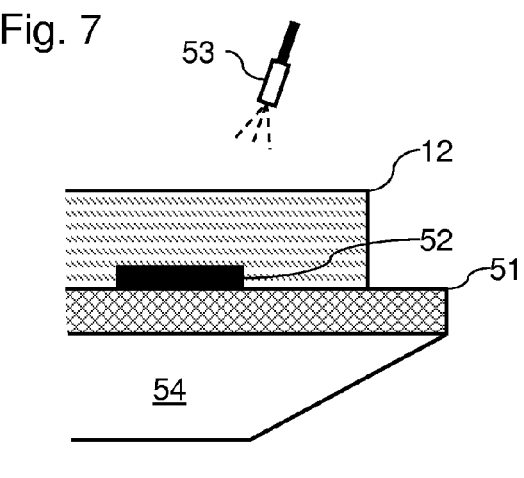
FIG. 7 is a cross-sectional view of a gas diffusion layer during one example of wet process for forming a watermark-type relief.
Figure 8:
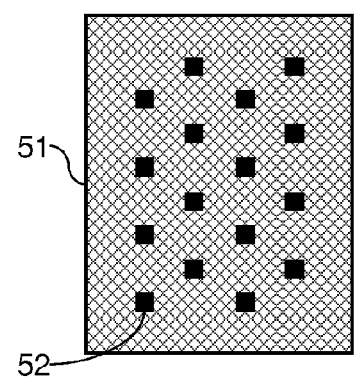
FIG. 8 is a top view of a device for implementing a wet process for forming a watermark-type relief.

FIGS. 7 and 8 illustrate an example process for manufacturing gas diffusion layers containing regions of smaller thickness. A smaller local thickness may be obtained using known processes for forming watermarks from fibrous suspensions. A gas diffusion layer containing watermark-type regions of smaller thickness may especially be produced by a wet process.

In such a wet process, an aqueous solution 12 is applied (as illustrated in FIG. 7) to a porous support 51 having a structure known per se. This support 51 is surmounted by an added relief 52 (sometimes also called an electrotype or galvano), defining regions of smaller thickness in the gas diffusion layer to be manufactured. The combination of a support 51 and an added relief 52 for forming such a gas diffusion layer is illustrated from above in FIG. 8. A device 54 for recuperating excess water is placed under the support 51, and includes for example a vacuum suction device. The support 51 is intended to let water contained in the aqueous solution 12 filter through in order to keep the rest of the components of the solution above the support 51.

The aqueous solution contains carbon fibers (known per se in the formation of gas diffusion layers) and a binder material (for example polyvinyl alcohol). The aqueous solution 12 may take the form of a dispersion including the various elements.

As illustrated in the example, the aqueous solution 12 may for example be applied by way of the spray nozzle 53 that is movable relative to the support 51. With a view to such application of the aqueous solution 12, the latter will possibly have a proportion by weight of carbon fibers lower than or equal to 0.02% (for example equal to 0.01%) during the spraying. The binder material may for example make up a proportion of 5 to 10% by weight of the gas diffusion layer formed.

Once the aqueous solution 12 has been applied to the support 51, most of the water of the latter is left to drain through the support 51, until an element that is solid enough to be handled is obtained. The solidified element comprises a thinned region the thickness of which is defined by the shape of the relief 52. The solidified element may then undergo other treatments such as drying in an oven or pressing, until a gaseous diffusion layer ready to be assembled inside the fuel cell 1 is obtained. Advantageously a gas diffusion layer having a substantially uniform composition is produced.

A wet manufacturing process in particular allows a gas diffusion layer having a flat first face (flat to within the roughness of the material of the gas diffusion layer) and a second face containing a relief to be obtained.

Regarding the welds of the metal sheets 41 and 42, their density is essentially defined by the mechanical strength desired for the joint between the sheets 41 and 42 of a bipolar plate. This weld density is advantageously comprised between 0.1 and 1 welds per $cm^2$. The weld density may also be defined by a ratio of the weld area to the section of the bipolar plate. The welds produced may be rectilinear, curvilinear with points of intersection or spot welding points.

The metal sheets 41 and 42 are advantageously made of stainless steel, a very commonplace material that is suitable for many, very widespread industrial transformation processes. The relief of the metal sheets 41 and 42, especially the flow channels 412 and 422, is for example generated by punching or stamping flat metal sheets. The metal sheets 41 and 42 of the various bipolar plates may be identical, in order to increase scale effects in components intended to be used to manufacture the fuel cell 1.

The invention claimed is:

1. A fuel cell stack, comprising:
   first and second membrane electrode assemblies;
   a metal bipolar plate interposed between the first and second membrane electrode assemblies, this bipolar plate comprising first and second metal sheets facing the first and second membrane electrode assemblies and securely fastened by welds; and
   a gas diffusion layer interposed and compressed between the first membrane electrode assembly and the bipolar plate;
   wherein prior to being compressed, regions of the gas diffusion layer surrounding the welds have a thickness smaller by at least 5 µm relative to the average thickness of the gas diffusion layer prior to being compressed, so that after compression of the gas diffusion layer the contact pressure of the gas diffusion layer with the bipolar plate in the area of the welds is lower than its average contact pressure with the bipolar plate.

2. The fuel cell stack as claimed in claim 1, in which said regions surrounding the welds have a uniform thickness.

3. The fuel cell stack as claimed in claim 1, in which said gas diffusion layer, prior to being compressed, has a flat first face and a second face containing a relief.

4. The fuel cell stack as claimed in claim 1, in which the contact pressure of the gas diffusion layer in the area of the welds is at least 15% lower than its average contact pressure.

5. The fuel cell stack as claimed in claim 1, in which:
   the first metal sheet of the bipolar plate comprises surfaces making contact with the gas diffusion layer and between which channels for guiding gas between the sheet and the gas diffusion layer are produced;
   wherein said welds are produced in the bottom of the guiding channels; and
   wherein said surfaces of the first sheet that are located on either side of said welds have a contact pressure with the gas diffusion layer lower than the average contact pressure between the gas diffusion layer and the first metal sheet.

6. The fuel cell stack as claimed in claim 1, comprising:
   third and fourth membrane electrode assemblies;
   another metal bipolar plate interposed between the third and fourth membrane electrode assemblies, said another metal bipolar plate comprising third and fourth metal sheets facing the third and fourth membrane electrode assemblies and securely fastened by welds, the welds of the first and second metal sheets being superposed on the welds of the third and fourth metal sheets; and
   another gas diffusion layer interposed and compressed between the third membrane electrode assembly and said another metal bipolar plate, the contact pressure of the other gas diffusion layer in the area of the welds being lower than its average contact pressure.

* * * * *